United States Patent Office 3,440,303
Patented Apr. 22, 1969

3,440,303
STABILIZED POLYVINYLCHLORIDE
COMPOSITIONS
Abraham Ravve and Chester W. Fitko, Chicago, Ill., assignors to Continental Can Company, Inc., New York, N.Y., a corporation of New York
No Drawing. Filed Oct. 21, 1965, Ser. No. 500,178
Int. Cl. C09f 29/20, 45/60
U.S. Cl. 260—847                    21 Claims

ABSTRACT OF THE DISCLOSURE

Polyvinylchloride resin compositions having improved heat stability are obtained by adding to the resin composition an effective amount of a thermosetting resin consisting essentially of the reaction product of at least one phenol, a polyamine, and an aldehyde.

---

This invention is directed to stabilized polyvinylchloride resin compositions and to the process of preparing same and more particularly to a new and improved stabilized composition of polyvinylchloride having outstanding resistance to discoloration and the like.

The polyvinylchloride resin compositions, as contemplated by this invention, include those resins prepared by the polymerization of vinylchloride, either alone or in combination with other unsaturated polymerizable compounds, including vinylidene chloride, acrylonitrile, styrene, vinyl esters of an aliphatic acid such as vinyl acetate, alkyl esters of olefinic acids such as dialkyl fumarate, and particularly the vinylchloride polymers prepared by polymerizing vinylchloride alone or in combination with vinyl acetate and vinylidene chloride. More specifically, this invention is directed to a method of stabilizing thermoplastic polyvinylchloride compositions and to thermoplastic heat and light stable compositions comprising vinylchloride and the various interpolymers thereof.

Thermoplastic compositions comprising polyvinyl halides are described in the literature as comprising a major amount of a high molecular weight vinyl halide polymer and a minor amount of a high molecular weight interpolymer. Although these particular compositions have outstanding properties and have been used in industry for many different purposes, they nevertheless lack the necessary heat and light stability. Heretofore, various attempts and different materials have been used as stabilizers including compounds which prevent discoloration caused by heat and light. The many compounds used for this purpose include, for example, the tin and lead compounds such as the alkyl tin maleates, metal stearates, alkaline earth metal phenates, and even some of the basic inorganic compounds including blue lead, lead silicate, calcium silicate, carbonates, iron oxide and the like. Unfortunately, however, most of these stabilizers have not proven to be entirely successful in minimizing discoloration of the polyvinylchloride resins particularly after prolonged exposure to elevated temperatures or light. On the other hand, a number of the known stabilizers, while being satisfactory for one purpose, are undesirable for another, such as, for example, unpleasant odors, contamination, insolubility, etc.

The valuable properties exhibited by polyvinylchloride as a component of a thermoplastic composition are well known and for this reason it is highly desirable to stabilize the compositions against sensitivity to both heat and light which is manifested by discoloration. Thus, for example, in compounding and processing a polyvinylchloride resin composition in a mold or in extruding various articles such as synthetic fibers or films or more particularly in preparing a coating composition, it is usually necessary to subject the resins to elevated temperatures, e.g., temperatures ranging as high as 450° F. Under these conditions there is a tendency for the resin to progressively yellow or darken, particularly after prolonged exposure to heat. In addition, the polyvinylchloride resins have been known to continuously develop a discoloration after being exposed to light after a period of time under normal usage. It is believed that the discoloration of the resin is a result of the liberation of hydrogen chloride which, in the past, has been inhibited by the addition of basic compounds including, for example, the alkali and alkaline earth metal salts, oxides and the like which react with the acid as it is liberated. As the liberated acid reacts with the basic compounds, however, their stabilizing effect is eventually diminished. Thus, it is desirable to have a material which not only is highly basic but which also can be added in small amounts to effectively inhibit the degradation and discoloration caused by the release of hydrogen chloride due to heat and light.

It has been found that in contrast to the basic constituents used heretofore, the high molecular weight thermosetting resins of this invention are effective as scavengers for hydrochloric acid when used in small amounts. More specifically, it has been found that free amino groups of the thermosetting resins of this invention are free to react with the hydrogen chloride to form neutral amine hydrochloride salts. The thermosetting resins of this invention are particularly useful in preparing plastic coating compositions comprising polyvinylchloride resins in a liquid organic vehicle. Thus, for example, when solutions or dispersions of polymers containing polyvinylchloride are applied to tinplate and baked at temperatures of about 340° F. or higher, to evaporate off the solvent and spread the resin, the polyvinylchloride tends to degrade by splitting-off hydrogen chloride causing the tinplate to darken and discolor. This effect is particularly enhanced on areas of the tinplate that reveal bare iron due to scratches or abrasions, thus causing the formation of ferric chloride which further catalyzes the decomposition of the polyvinylchloride.

Accordingly, it is an object of this invention to provide polyvinylchloride compositions which have improved resistance to discoloration upon being exposed to heat or light. It is another object of this invention to provide an improved stabilizing composition which increases the resistance of polyvinylchloride compositions to discoloration by neutralizing the hydrogen chloride released during thermal treatment.

It is another object of this invention to provide a high molecular weight thermosetting resin which may be used as a stabilizing agent for polyvinylchloride compositions.

It is another object of this invention to provide high molecular weight thermosetting resin compositions which may be used in small but effective amounts as a stabilizing agent for polyvinylchloride compositions by neutralizing the hydrogen chloride released from the polymer during thermal treatment.

It is a further object of this invention to provide a method of stabilizing polyvinylchloride compositions by incorporating therein small but effective amounts of a high molecular weight thermosetting resin capable of neutralizing any hydrogen chloride released from the polymer.

It is still another object of this invention to provide a polyvinylchloride composition particularly useful as a coating for tinplate which comprises small but effective amounts of a high molecular weight thermosetting resin as the stabilizing agent.

It is still another object of this invention to provide a method of coating tinplate with polyvinylchloride compositions which are stabilized against degradation by incorporating with said polyvinylchloride effective amounts of a high molecular weight thermosetting resin stabilizing agent.

It is still a further object of this invention to provide a stabilizing agent comprising a high molecular weight thermosetting resin which contains free amino groups capable of reacting with the hydrogen chloride released from the polyvinylchloride to prevent discoloration.

It is still a further object of this invention to provide a high molecular weight thermosetting resin as a stabilizing agent for polyvinylchloride compositions which cannot be leached readily from said polymeric composition and contains a sufficient number of free amino groups to react with the hydrogen chloride to prevent discoloration.

These and other objects of the invention will become apparent from a further and more detailed description of the invention as follows:

More specifically, this invention is directed to a composition of matter comprising polyvinylchloride compositions containing therein effective amounts ranging from 0.1 to 5.0% by weight of a high molecular weight thermosetting resin as a stabilizing agent. The thermosetting resin consists essentially of the reaction product of at least one phenol including hydroxybenzene and hydrocarbon-substituted phenols, a polyamine and an aldehyde. The phenol may be present during the condensation reaction in amounts ranging from about 1 to 4 moles of phenol per mole of the polyamine with the aldehyde being present in an amount ranging from about 0.8 to 1.8 moles of the aldehyde per mole of phenol. The reactants are condensed at temperatures ranging from about 50° C. to about 100° C. and more preferably at temperatures ranging from 75° C. to 95° C. for periods of about 2 to 8 hours.

The polyvinylchloride compositions may be described as thermoplastic resinous materials consisting of carbon, hydrogen and chlorine atoms and containing recurring units of chloro ethylene having 1 to 2 chlorine atoms on only one of the ethylene carbons. The polyvinylchloride resins are well known and comprise homo-polymers of vinylchloride and copolymers of vinylchloride wherein the essential polyvinylchloride chains are interspersed at intervals with the residues of other monoethylenically unsaturated compounds or conjugated diethylenically unsaturated compounds.

Suitable compounds for copolymerization with the vinylchloride include, for example, the vinyl esters such as vinyl acetate, vinyl chloro acetate, vinyl butyrate; vinyl ethers such as vinylethyl ether, vinylisopropyl ether, vinylchloro ethyl ether; cyclic unsaturated compounds including styrene, polychloro styrenes, vinylnaphthalenes, vinylpyridines; acrylic acid and its derivatives such as ethylacrylate, methylmethacrylate, ethylmethacrylate, acrylonitrile, methacrylonitrile, diethylmaleate, diethylfumarate; the vinylidene compounds including vinylidene chloride, vinylidene bromide, vinylidene fluoro chloride; the unsaturated hydrocarbons such as ethylene, propylene, isobutene; allyl compounds such as allyl acetate, allyl chloride, allyl ethyl ether; and conjugated and cross-conjugated ethylenically unsaturated compounds including butadiene, isoprene, chloroprene, and the like. The stabilizing agents of this invention are particularly useful in combination with vinylchloride resins prepared by polymerizing vinylchloride alone or in combination with acrylonitrile, vinylidene chloride or vinyl acetate and especially with polyvinylchloride compositions containing at least about 10% by weight of a halogen-containing monomer.

The amount of phenolic-amine resin to be added to the polyvinylchloride composition as the stabilizing agent will depend upon the number of free amino groups present within the resin which, in turn, depends upon the particular polyamine used in preparing the product. Generally, the stabilizing agent is added to the above-mentioned polyvinylchloride compositions in amounts ranging from 0.1 to 5.0% by weight and more preferably in amounts ranging from about 0.1 to 3.0% by weight. The particular polyamine used in preparing the condensation product, however, will determine the amount of stabilizing agent to be added to the polyvinylchloride compositions. Thus, for example, in utilizing tetraethylenepentamine as the amine component in the phenolic resin, there are approximately 2 to 3 reactive amino groups per phenolic group, and therefore, less than 0.5 of the phenolic-amine resin is needed to stabilize the polyvinylchloride composition. However, when guanidine or guanidine carbonate is used as the amine component of the phenolic-amine resin, it is necessary to use more than 3% by weight of the stabilizing agent in order to obtain a polyvinylchloride composition which is sufficiently resistant to the degradation of heat and light. The reactants are condensed in a conventional manner at temperatures ranging from 50° C. to 100° C. and more preferably at temperatures ranging from 75° C. to 95° C. over periods ranging from 2 to 8 hours.

In addition to hydroxybenzene or phenol, other hydrocarbon-substituted phenols may be used and include, for example, at least one branched or straight-chain alkyl-substituted phenol, such as ethyl phenol, propyl phenol, diethyl phenol, dipropyl phenol, octyl phenol, nonyl phenol, tertiary-butyl phenol, cresol, xylenol, thymol, dioctyl phenol, dinonyl phenol, dodecyl phenol, and other alkyl phenols having alkyl substituents of 1 to 18 carbon atoms.

The polyamine component used in preparing the condensation reaction product comprises the primary, secondary and tertiary polyamines and more particularly the secondary amines which form strong bases and thus are highly reactive with strong acids. Among the polyamines are included one or more of the alkyl polyamines, guanidine, or guanidine carbonate which are highly basic, such as tetramethylenepentamine, trimethylenetetramine, ethylenediamine, diethylenetriamine, triethylenetetramine, tetraethylenepentamine, propylenediamine, butylenediamine, pentamethylenediamine, hexamethylenetetramine, hexamethylenediamine, ethyl ethylenediamine, hydroxyethyl ethylenediamine, 1,3-propylenediamine, and other alkylene polyamines characterized by the formula $H_2N(C_nH_{2n})_xH$ wherein $n$ is 2 or more and $x$ is 1 or more.

As the condensing agent, formaldehyde is preferred but other methylene-yielding compounds may be used such as paraformaldehyde, acetaldehyde, propionaldehyde, butyraldehyde, furfurylaldehyde, and the like. The preferred condensation agent, however, is formaldehyde in any of its commercially available forms, such as the aqueous formaldehyde solutions known as Formalin or the alcoholic solutions such as Formcel.

The above reactants are condensed at temperatures ranging up to 100° C. in a basic medium under reflux conditions until a thermosetting product is obtained as illustrated by the following examples.

Example I

| | Parts by weight |
|---|---|
| Phenol | 94 |
| Tetraethylenepentamine | 126 |
| Butyl Formcel (40% solution of formaldehyde and butanol) | 125 |

The butyl Formcel was added over a period of about 30 minutes dropwise to a solution of the phenol and tetraethylenepentamine. The temperature of the reactants was held below approximately 80° C. The reactants were held at approximately 80° C. for about four hours and then washed three times with water at 70–80° C. Approximately 50 mls. of butyl alcohol were added to the mixture and the resin was dried by azeotropic distillation under a vacuum. The dried resin was diluted to approximately 60% solids with methylethyl ketone.

Example II

| | Parts by weight |
|---|---|
| Phenol | 47 |
| Nonylphenol | 110 |
| Butyl Formcel (40% solution of formaldehyde and butanol) | 112 |
| Guanidine carbonate | 121 |

A solution of the above reactants was heated at 80° C. for about two hours. Then approximately 60 parts by weight of triethylamine and 40 additional parts by weight of the butyl Formcel were added to the reactants and the reaction was continued for approximately another hour at 80° C. The resulting resin was washed three times with hot water and ultimately mixed with 100 mls. of butyl alcohol. The water was stripped from the mixture under a vacuum and the resin concentration was adjusted to about 65% solids.

The product obtained by the use of the guanidine carbonate may be illustrated by the following formula, wherein R is an alkyl group or hydrogen depending upon the particular phenol used.

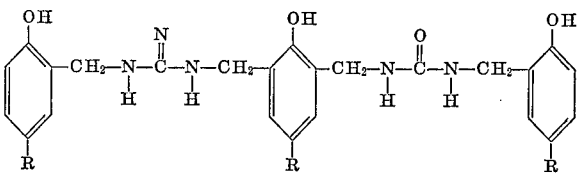

The manner in which the stabilizing agents of this invention are incorporated in the polyvinylchloride compositions is not of any particular importance and they may be added to the resin in the form of a solution or in the presence of a liquid which may or may not be a solvent for the resin. In addition, the stabilizing agents may be added to the polymeric composition in the solid form by mixing the components in a conventional Banbury mixer. More specifically, small amounts, e.g., 0.1 to 3.0% by weight of the stabilizing agents as prepared in the above examples may be milled together on a roll mill at temperatures ranging up to 340° F. until a homogeneous blend is obtained.

The problems inherent in stabilizing the polyvinylchloride resins vary depending upon a number of different factors including, for example, the chemical composition of the resin, the form in which the resins are to be ultimately used and the processing conditions to which the resins are exposed. Any one stabilizer useful for a specific polyvinylchloride composition may not be as satisfactory as a stabilizing agent for a related but different polyvinylchloride composition. For example, a particular stabilizing agent, while being effective for stabilizing some products such as synthetic fibers prepared from a range of polyvinylchloride resins, may or may not, nevertheless, be effective for stabilizing other products such as films or coatings prepared from the same or similar compositions. It has been found, however, that the high molecular weight thermosetting resins of this invention are effective for stabilizing most polyvinylchloride compositions which contain at least 10% by weight of a halogen-containing monomer.

Of the many uses to which polyvinylchloride compositions may be applied including, for example, sheets, pipes, slabs, fibers, etc., one of the most important is the preparation of coating compositions particularly for the metal can industry. Here, in preparing coherent protective films on metal, such as tinplate, the coating of resin must be fused onto the surface by heating to temperatures ranging up to about 400° F. or higher. The final film must have sufficient flexibility to withstand processing operations, i.e., bending and forming, normally encountered in fabricating commercial items, such as metal cans or the like. To accomplish this, the polyvinylchloride resins are usually modified by adding thereto plasticizers including, for example, the polyesters, epoxidized esters of polyhydric alkanols and oleic or linoleic acid, and other compounds which are compatible with the resin and have a low volatility at the fusing or baking temperatures.

Typical coating compositions, particularly useful in the manufacturing of metal cans, comprise solutions and/or dispersions of the polyvinylchloride resins in organic solvents in amounts ranging from 10–80% solids. Various organic liquids depending upon whether or not the coating is prepared from a solution or a dispersion of the polyvinylchloride may be used and include the aliphatic ketones having boiling points ranging up to about 425° F. such as diisobutyl ketone, methylisobutyl ketone, and a number of the ether alcohols having high boiling points. In addition, various aromatic hydrocarbons and mixtures thereof may be used as a diluent in preparing the coating compositions and include, for example, xylene, toluene, benzene and the like.

The stabilized polyvinylchloride compositions of this invention may be combined, of course, with other known compounding ingredients such as, for example, fillers including ground clay, coloring pigments, carbon black, extenders, waxes, lubricants, plasticizers and other known stabilizing agents including, for example, basic metal carbonates, lead silicate, calcium silicate and other resinous materials.

While this invention has been described with respect to a number of specific embodiments, it is obvious that there are other variations and modifications which can be resorted to without departing from the spirit of the invention, except as more particularly pointed out in the appended claims.

We claim:

1. A method of stabilizing polyvinylchloride resin compositions which comprises adding to said compositions 0.1 to 5% by weight of a high molecular weight thermosetting resin consisting essentially of the reaction product of at least one phenol, a polyamine and an aldehyde, said thermosetting resin having been prepared by coreacting at temperatures ranging from 50° C. to about 100° C. for about 2 to 8 hours approximately 1 to 4 moles of phenol per mole of the polyamine and 0.8 to 1.8 moles of aldehyde per mole of phenol.

2. The method of claim 1 further characterized in that the phenol is at least one hydrocarbon-substituted phenol having 1 to 18 carbon atoms in the substituent.

3. The method of claim 2 further characterized in that the phenol is tertiary butyl phenol.

4. The method of claim 2 further characterized in that the substituted phenol is nonyl phenol.

5. The method of claim 1 further characterized in that the phenol is hydroxybenzene.

6. The method of claim 1 further characterized in that the phenol is a mixture in any proportion of hydroxybenzene and nonyl phenol.

7. The method of claim 1 further characterized in that the polyamine is an alkyl polyamine.

8. The method of claim 7 further characterized in that the polyamine is tetraethylenepentamine.

9. The method of claim 7 further characterized in that the polyamine is guanidine carbonate.

10. The method of claim 7 further characterized in that the polyamine is tetramethylenepentamine.

11. The method of claim 7 further characterized in that the polyamine is trimethylenetetramine.

12. The method of claim 1 further characterized in that the aldehyde is formaldehyde.

13. The method of claim 1 further characterized in that the aldehyde is paraformaldehyde.

14. The method of claim 1 further characterized in that the aldehyde is an alcoholic solution of formaldehyde.

15. A thermoplastic composition consisting essentially of a major amount of a polyvinyl chloride resin composition and 0.1 to 5% by weight of a high molecular weight thermosetting resin stabilizing agent, said stabilizing agent consisting essentially of the reaction product of at least one phenol, a polyamine and an aldehyde, the reaction product being obtained by the co-condensation at temperatures ranging from 50° C. to about 100° C. for about 2 to 8 hours, of approximately 1 to 4 moles of the phenol per mole of polyamine and 0.8 to 1.8 moles of the aldehyde per mole of phenol.

16. The composition of claim 15 further characterized in that the stabilizing agent consists essentially of the reaction product of a mixture of phenol in any proportion, a polyamine and an alcoholic solution of formaldehyde.

17. The composition of claim 16 further characterized in that the mixture of phenols consists of hydroxybenzene and nonyl phenol and the polyamine is guanidine carbonate.

18. The composition of claim 15 further characterized in that the polyamine is selected from the group consisting of tetraethylenepentamine, tetramethylenepentamine and trimethylenetetramine.

19. The composition of claim 15 further characterized in that the polyvinylchloride resin composition contains at least 10% by weight of the halogen-containing monomer.

20. The composition of claim 19 further characterized in that the polyvinylchloride resin composition contains copolymers of vinylchloride and unsaturated polymerizable compounds selected from the group consisting of vinylidene chloride, acrylonitrile, vinyl acetate, and alkyl esters of mono-olefinic acids.

21. The composition of claim 15 further characterized in that the resin composition is polyvinylchloride.

References Cited

UNITED STATES PATENTS

| | | | |
|---|---|---|---|
| 1,780,636 | 11/1930 | Stine | 260—51.5 |
| 2,190,776 | 2/1940 | Ellingboe et al. | 260—847 |
| 2,419,166 | 4/1947 | Rogers et al. | 260—847 |
| 2,421,852 | 6/1947 | Rogers et al. | 260—847 |
| 2,454,209 | 11/1948 | Rogers et al. | 260—847 |
| 2,479,409 | 8/1949 | Roedel | 260—847 |
| 2,554,262 | 5/1951 | Nagel | 260—847 |
| 2,585,196 | 2/1952 | Walton | 260—51.5 |

SAMUEL H. BLECH, *Primary Examiner.*

JOHN C. BLEUTGE, *Assistant Examiner.*

U.S. Cl. X.R.

117—132, 161; 260—28.5, 31.6, 32.8, 33.6, 38, 39, 45.7, 45.75, 51.5